Patented Aug. 24, 1937

2,090,741

UNITED STATES PATENT OFFICE 2,090,741

ACID ACTIVATED CLAY

Ernest W. Zublin, Fort Worth, Tex., assignor to Texas Pacific Coal & Oil Co., Fort Worth, Tex., a corporation of Texas No Drawing. Application December 8, 1932, Serial No. 646,303

17 Claims. (Cl. 252—2)

This invention relates to acid-activated clays and more particularly to the treatment of such clays after activation either before or during use in the decolorization of oils, for the purpose of maintaining or increasing their purifying ability.

For the decolorization of oils of mineral or organic origin, the most efficient clays are acid activated Bentonites, Montmorillonites, Halloysites, etc., and related clays. Such clays for activation are treated with varying amounts of strong mineral acids, usually sulphuric or hydrochloric acids, washed with water and, in accordance with prior practice, are then either mixed with oil while in pulp form, or first dried and then mixed with the oil. In either case the mixture of oil and clay is generally heated to temperatures ranging from 250 to 700° F., depending upon the nature of the oil as well as that of the clay in order to accomplish the transfer of coloring matter from the oil to the clay. If the clay is used in pulp form, then during the heating, water is evaporated and causes considerable and troublesome foaming. Special and expensive equipment is necessary and has been used to obviate this foaming. If the clay is first dried by prior methods to a water content at which it no longer will cause excessive foaming when heated to a temperature above 250° F. in admixture with oils, drying causes it to lose part of its decolorizing efficiency, the efficiency in the present instance being measured as the relation of the weight of clay required on a dry basis to produce an oil of a color identical with that produced with a weight of some standard clay used in 10% by weight proportion to the oil.

Accordingly, a principal object of the present invention is to provide a process for drying acid-activated clays which preserves their original decolorizing efficiency.

Another object is to provide a process capable of increasing the decolorizing efficiency of already dried acid-activated clays where the drying has decreased their efficiency.

A further object of the invention is to provide a method of simultaneously increasing the efficiency of dried acid activated clays where the drying has decreased their efficiency and of treating oils to be decolorized with such clays.

I have discovered that if acid-activated clay pulps prepared from such clays as California "Palex" or Oklahoma "Woodite", and others, are dried at temperatures not exceeding 250° F. a strict relation is found between moisture content of the dried clay and its efficiency. If moisture is plotted against efficiency on semi-log-arithmic paper a straight line results on the graph. See, for example, the article by E. R. Lederer and E. W. Zublin, in the National Petroleum News of August 31, 1932, page 27. The mathematical formula for the moisture efficiency relation is $E = 104 - 10 \, (1.64 - .015 \, M)$ where
$E =$ Efficiency
$M =$ Moisture The theory proposed concerning this relation is that the most active ingredients of activated clays are primary aluminum salts of poly-silicic acids. Such primary poly-silicates carry a number of free hydroxyl radicals which because of their chemical position are capable of giving off hydrogen ions. These hydroxyl radicals are believed to be responsible for the bleaching action of the clay, although the manner in which they exert their action is not altogether clear. Some investigators believe it to be due to the hydrogen ions available from them while others assume a loose combination of said radicals with the coloring matter.

It is immaterial to my invention by what mechanism decolorization takes place for in either case the hydroxyl radicals are responsible for it. Destroying, altering, or removing all or part of them will reduce the efficiency in direct proportion to the number removed or rendered ineffective. For instance, the addition of alkali to activated clays lowers their efficiency by converting the acid reacting hydroxyl radicals to their alkali salt of neutral or basic reaction.

If one considers the chemical structure of a typical aluminum silicate, which is believed to be one of the most common in activated bleaching clays, one can easily understand why drying such a clay may cause it to lose efficiency. For instance, the mono-aluminum salt of the disilicic acid has the following formula:

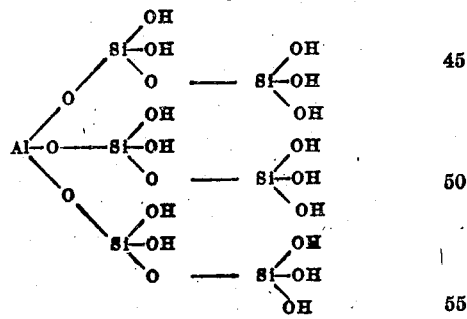

As will be noted, this compound has fifteen hydroxyl radicals three groups of three, and three groups of two. It is a well known fact that to chemists that where there are two or more hydroxyl radicals grouped around a single atom, in the instant case the silicon atom—water of hydration can be lost. The ease with which such water is removed depends primarily on the number of OH radicals grouped around the single atom and the more there are the more easily water is lost. Thus it is likely that water of hydration secedes most easily from the three groups of three hydroxyl radicals. The partial dehydration of clay apparently results in the following compound:

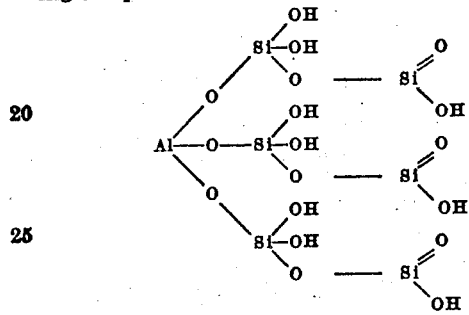

From this formula it will be observed that of the original fifteen radicals six are removed, or 40% of the total. If this formula is correct the efficiency of this compound as compared with the original completely hydrated one should be 60%. As may be observed from the hereinbefore mentioned graph, the moisture-efficiency line goes through the 60% efficiency point for 0% moisture. This represents a remarkable check.

The problem of drying acid activated clays in a manner which preserves their efficiency resolves itself to the task of fractionating the water of physical admixture from the water of chemical hydration. Water of admixture can be removed without affecting the efficiency of the clay down to a point at which its vapor pressure is equal to or lower than that of the water of hydration. Normally, admixed water has a slightly higher vapor pressure than water of hydration but this difference is so small that attempts heretofore made to evaporate only admixed water have caused a loss of hydroxyl radicals even when drying was carried out at room temperatures.

I have discovered in accordance with and constituting a principal feature of the present invention, that by exposing the clay to superheated steam, preferably at super-atmospheric pressures, a fair fractionation of the admixed from the combined moisture can be achieved. It has also been discovered that the temperature of the steam and its pressure must stand in a definite relation for optimum results. The steam should be at a temperature above that of its saturation point at the existing pressure in the drying vessel by not more than about 50° F., preferably less.

For example, activated "Woodite" clay pulp is deposited in a filter press and then steam at a temperature of 270° F. is passed therethrough for a period of about 40 minutes under a back pressure of 16 pounds. At 16 pounds pressure above atmospheric the temperature of saturated steam is 252° F. Hence, the steam in this example is superheated by 18° F. Clay thus treated has a moisture content of 20% and an efficiency of 100% of the original clay pulp.

It is not necessary that the steaming be carried out in a filter press, for although this is generally the most convenient way of doing it, any apparatus in which the wet clay can be brought in thorough contact with steam under the proper conditions is suitable.

Constituting a second feature of the present invention I have discovered that partially dehydrated clays of decreased efficiency can be regenerated to substantially their original efficiency. Dried clays that have lost part of their efficiency in drying can be revivified by exposing them to saturated or very slightly superheated steam at super-atmospheric pressures. I have discovered that if steam pressures in excess of 50 pounds are employed, such re-activation takes place in a reasonably short time and is a commercially satisfactory process. At lower pressures reactivation can be effected but it takes place at rates too slow to be of commercial importance. Saturated steam revivifies clays somewhat faster than slightly superheated steam, but has the disadvantage of producing a clay product of high moisture content. The application of steam at 100 to 150 pounds pressure at temperatures of from 2 to 10° F. above its saturation point produces substantially dry clays of high efficiency, within 15 to 40 minutes.

For example, dried activated "Woodite" having a moisture content of 19% and an efficiency of 75% as compared with its original pulp is exposed for 15 minutes to saturated steam of 110 pounds per square inch. The resulting clay contains 30% moisture and has an efficiency of 95%.

Clays that have been "over-dried", i. e., that have been dried under such severe conditions that they have an efficiency lower than their moisture-efficiency line indicates they should have, cannot altogether be revivified by steam, possibly because of chemical changes other than simple dehydration which may have occurred during the drying process. Thus if a "Woodite" clay having 73% efficiency and 20% moisture is given the same steam treatments as the 19% moisture and 75% efficiency clay of the previous example, there results a product having an efficiency of 90% as against 95% in the previous test.

In accordance with a third feature of the instant invention, I have discovered that oils can be more efficiently decolorized where ordinary dried acid activated clay is employed if steam under a substantial super-atmospheric pressure is introduced into the mixture of oil and clay while the temperature is gradually raised. In this case, the dried clay appears to be revivified simultaneously with the decolorization of the oil. I have found that for economical performance steam pressures of not less than 50 pounds per square inch should be applied.

In my preferred procedure, I heat the mixture of dried activated clay and oil to about the boiling point of water or between about 200 to 250° F., in a shell still or other suitable closed vessel in which a means has been provided for thorough agitation. Steam is then introduced until the pressure builds up to about 100 pounds. The pressure is preferably maintained by the introduction of additional steam, which introduction may be regulated automatically. When the temperature for optimum decolorization has been reached, which in the case of "Woodite" is around 420° F., the pressure is released and the contacted batch of oil withdrawn and separated from the clay in any suitable manner, as by filtering. In this manner the oil is decolorized without foaming or other objections which arise with the use of wet clay. Instead of shell stills, pipe stills can be used as well, provided the oil and the clay mixture is thoroughly agitated and steam is introduced during the heating and circulating period.

A dried activated "Woodite" clay containing 19% moisture and having upon dry contacting an efficiency of 75% had when employed as above described, an efficiency of 90%. If pressures as low as 20 pounds are employed, absolutely no increase in efficiency is obtained.

It should be understood that I do not intend that the instant invention be limited to "Woodite" clay only or to any special equipment described or to any theory of operation set out herein. Other acid-activated clays such as California "Palex" or "Filtrol" etc., behave similarly to "Woodite", except that their moisture-efficiency lines are somewhat different, and that optimum conditions as to temperatures of contacting, minimum pressures required, reactivation, etc., differ slightly from the examples cited. The instant invention is limited only by the scope of the appended claims.

I claim:

1. The process of drying acid-activated clay comprising treating the same with superheated steam for a period of time sufficient to reduce the amount of physically admixed moisture to within a range of 50-20% of the dried clay, but insufficient to remove water of hydration.

2. The process of drying acid-activated clay comprising evaporating only physically admixed water by treating the same with super-heated steam for a period sufficient to reduce the amount of physically admixed moisture to about 20% of the dried clay.

3. The process of drying acid-activated clay comprising evaporating only the physically admixed water by treating the same with super-heated steam under super-atmospheric pressure.

4. The process of drying acid-activated clay comprising evaporating only the physically admixed water by treating the same with steam superheated by not more than 50° F.

5. The process of drying acid-activated clay comprising evaporating only the physically admixed water by treating the same with steam superheated by not more than 50° F. under super-atmospheric pressure.

6. A fully hydrated washed acid-activated clay having from 20 to 50% physically admixed moisture.

7. A washed partially dried acid-activated clay containing less than 50% and more than about 20% of physically admixed water having a decolorizing efficiency unimpaired by drying.

8. The process of producing acid-activated clay having less than 50% physically admixed moisture and having substantially all of its water of hydration, from overdried acid-activated clay comprising treating such clay with superheated steam under super-atmospheric pressure of at least 50 lbs. for a period sufficient to increase the amount of physically admixed moisture to within a range of 20-50% of the dried clay.

9. The process of raising the decolorizing efficiency of overdried acid-activated clay comprising treating the same with steam under super-atmospheric pressure for a period sufficient to increase the amount of physically admixed moisture to within a range of 20-50% of the dried clay.

10. The process of raising the decolorizing efficiency of overdried acid-activated clay comprising treating the same with steam under super-atmospheric pressure of at least 50 pounds for a period sufficient to increase the amount of physically admixed moisture to within a range of 20-50% of the dried clay.

11. The process of raising the decolorizing efficiency of overdried acid-activated clay comprising treating the same with steam under super-atmospheric pressure of at least 50 pounds, and superheated to a degree not in excess of 50° F.

12. The process of increasing the decolorizing efficiency of overdried acid-activated clay comprising treating the same with saturated steam for a period sufficient to increase the amount of physically admixed moisture to within a range of 20-50% of the dried clay.

13. The process of increasing the decolorizing efficiency of overdried acid-activated clay comprising treating the same with saturated steam under a super-atmospheric pressure for a period sufficient to increase the amount of physically admixed moisture to within a range of 20-50% of the dried clay.

14. The process of increasing the water of hydration content without increasing the physically admixed water to an objectionable extent, of overdried acid-activated clay comprising passing steam through a body of said clay, under a super-atmospheric pressure of at least 50 pounds, for a period sufficient to increase the amount of physically admixed moisture to within a range of 20-50% of the dried clay.

15. The process of raising the decolorizing efficiency of overdried acid-activated clay containing not more than about 50% moisture, and of simultaneously treating oil therewith comprising mixing oil to be decolorized with such clay, heating the mixture, and introducing steam during heating whereby a super-atmospheric pressure of not less than 50 pounds is reached, said treatment to continue till decolorizing action is complete.

16. The process of raising the decolorizing efficiency of overdried acid-activated clay containing not more than about 50% moisture, and of simultaneously treating oil therewith comprising contacting oil to be purified with such clay, introducing steam in the mixture and maintaining a super-atmospheric pressure of about 50 lbs. per square inch on said mixture, whereby water of hydration is introduced into said clay and said oil is purified said treatment is continued until decolorizing action is complete.

17. The process of decolorizing oil with overdried acid-activated clay containing not more than about 50% moisture, comprising mixing oil and such clay, heating the mixture to a temperature above the boiling point of water, introducing steam, maintaining a pressure of not less than about 50 pounds in the contacting zone, raising the temperature of the mixture during the admission of steam, to a point where the decolorization action is complete, releasing the pressure after completion of the decolorization and separating the clay from the purified oil.

ERNEST W. ZUBLIN.